US012800703B2

(12) United States Patent
Herbertsson et al.

(10) Patent No.: US 12,800,703 B2
(45) Date of Patent: Nov. 17, 2026

(54) CELLULAR ACCESS NETWORK COORDINATED RADAR SYSTEM

(71) Applicant: MAGNA ELECTRONICS SWEDEN AB, Vargarda (SE)

(72) Inventors: Hans Herbertsson, Vargarda (SE); Mats Rydstrom, Vargarda (SE); Olof Eriksson, Vargarda (SE)

(73) Assignee: MAGNA ELECTRONICS SWEDEN AB, Vargarda (SE)

( * ) Notice: Subject to any disclaimer, the term of this patent is extended or adjusted under 35 U.S.C. 154(b) by 347 days.

(21) Appl. No.: 18/558,981

(22) PCT Filed: Apr. 22, 2022

(86) PCT No.: PCT/EP2022/060668
§ 371 (c)(1),
(2) Date: Nov. 3, 2023

(87) PCT Pub. No.: WO2022/233592
PCT Pub. Date: Nov. 10, 2022

(65) Prior Publication Data

US 2024/0241217 A1 Jul. 18, 2024

(30) Foreign Application Priority Data

May 5, 2021 (SE) .................................... 2150570-6

(51) Int. Cl.
*G01S 7/02* (2006.01)
*G01S 7/00* (2006.01)
(Continued)

(52) U.S. Cl.
CPC .............. *G01S 7/023* (2013.01); *G01S 7/003* (2013.01); *G01S 7/0232* (2021.05);
(Continued)

(58) Field of Classification Search
CPC ...... G01S 7/023; G01S 7/0235; G01S 7/0232; G01S 7/003; G01S 7/35; G01S 13/931
See application file for complete search history.

(56) References Cited

U.S. PATENT DOCUMENTS 11,275,174 B2 * 3/2022 Smith ..................... G01S 7/023
2002/0003488 A1 * 1/2002 Levin ..................... G08G 1/163
342/60

(Continued)

FOREIGN PATENT DOCUMENTS

CN 109842866 A 6/2019
CN 110192119 A 8/2019

(Continued)

OTHER PUBLICATIONS

International Search Report and Written Opinion regarding corresponding PCT App. No. PCT/EP2022/060668; issued Aug. 4, 2022.

(Continued)

*Primary Examiner* — Marcus E Windrich
(74) *Attorney, Agent, or Firm* — DICKINSON WRIGHT PLLC

(57) ABSTRACT

A radar system for coordinated automotive radar transmission, comprising a cellular access network node configured to establish a primary time synchronized frame structure (310) for cellular radio transmissions over a first local area in a first frequency band (F1), wherein the primary time synchronized frame structure (310) is at least partly defined by one or more transmitted synchronization signals (320), and one or more automotive radar transceivers arranged to determine a radar time reference (T0) from the one or more synchronization signals (320), and to establish a secondary time synchronized frame structure (330) for radar transmissions over at least part of the first local area in a second (Continued)

100 frequency band (F2), wherein the secondary time synchronized frame structure (330) is at least partly defined by the radar time reference (T0).

13 Claims, 5 Drawing Sheets

(51) Int. Cl.
*G01S 7/35* (2006.01)
*G01S 13/931* (2020.01)

(52) U.S. Cl.
CPC .............. *G01S 7/0235* (2021.05); *G01S 7/35* (2013.01); *G01S 13/931* (2013.01); *G01S 2013/9316* (2020.01)

(56) References Cited

U.S. PATENT DOCUMENTS

| | | | | |
|---|---|---|---|---|
| 2016/0032780 | A1* | 2/2016 | Grogg | F01D 25/28 415/177 |
| 2016/0061935 | A1* | 3/2016 | McCloskey | G01S 13/931 342/82 |
| 2018/0149730 | A1 | 5/2018 | Li et al. | |
| 2019/0383925 | A1 | 12/2019 | Gulati et al. | |
| 2020/0025865 | A1* | 1/2020 | Gulati | G01S 13/42 |
| 2020/0025866 | A1 | 1/2020 | Gulati et al. | |
| 2020/0309933 | A1 | 10/2020 | Ray | |
| 2021/0003662 | A1 | 1/2021 | Aydogdu et al. | |
| 2022/0390583 | A1* | 12/2022 | Himmelstoss | G01S 7/023 |

FOREIGN PATENT DOCUMENTS

| | | | |
|---|---|---|---|
| CN | 110462432 | A | 11/2019 |
| CN | 111492700 | A | 8/2020 |
| CN | 111756463 | A | 10/2020 |
| DE | 102017216435 | A1 | 3/2019 |
| DE | 102019215358 | A1 | 4/2021 |
| EP | 3173812 | A1 | 5/2017 |
| JP | 2020012773 | A | 9/2021 |
| KR | 101184622 | B1 | 2/2012 |
| WO | 2014126289 | A1 | 8/2014 |

OTHER PUBLICATIONS

Lin, et al., "5GNew Radio: Unveiling the Essentials of the Next Generation Wireless Access Technology," IEEE Communications Standards Magazine; Sep. 2019; pp. 30-37.
Aydogdu, et al., "RadChat: Spectrum Sharing for Automotive Radar Interference Mitigation," IEEE Transactions on Intelligent Transportation Systems; vol. 22, Issue 1; Jan. 2021.
Search Report regarding First Office Action issued in corresponding CN App. No. 202280030519.7; issued Apr. 22, 2026.

* cited by examiner

CELLULAR ACCESS NETWORK COORDINATED RADAR SYSTEM

CROSS-REFERENCE TO RELATED APPLICATIONS

This application is a 35 U.S.C. § 371 national phase of PCT International Application No. PCT/EP2022/060668, filed Apr. 22, 2022, which claims the benefit of priority under 35 U.S.C. § 119 to SE Patent Application No. 2150570-6, filed May 5, 2021, the contents of each are incorporated herein by reference in their entirety.

DESCRIPTION OF THE DISCLOSURE

The present disclosure relates to automotive radar systems, and in particular to interference mitigation for frequency modulated continuous wave (FMCW) radar transceivers. There are disclosed systems and radar transceivers for coordinating radar transmissions in order to mitigate interference.

A modern car often comprises a plurality of radar transceivers for use in applications such as advanced driver assistance systems (ADAS). A relatively strong radar signal is normally transmitted from a front radar on the vehicle in order to detect objects in front of the vehicle at long distance, while more short range radars are used as side radars and rearward looking radars. As old cars are replaced by new cars on public roads, more and more automotive radar transceivers are being introduced into the traffic infrastructure, which means that the density of radar transceivers on public roads increases rapidly.

Automotive radars are generally based on the well-known FMCW signal format, which is a frequency swept signal that is sometimes also referred to as a chirp signal. This signal format allows for high performance radar transceivers to be produced at low cost and has therefore become very popular.

Most automotive radar transceivers operate in dedicated automotive radar frequency bands, where automotive radar transmissions are allowed without any coordination. This means that radar signals may interfere with each other since there is nothing preventing the radar transmissions from simultaneously occupying the same frequencies. For an FMCW signal, such interference causes bursts of disturbance in the received signal, which complicates target detection and reduces overall radar performance. The interference problem is expected to become worse over time as the density of radar transceivers in the traffic infrastructure increases.

Effective methods to mitigate the effects of automotive radar interference after it occurs have been proposed. For instance, EP3173812 A1 discloses a method for interference mitigation which relies on the generation of an approximation signal which is used to replace interfered radar signal samples.

Methods have also been proposed which aims at mitigating interference in automotive radar by coordinating transmissions, i.e., avoiding simultaneous transmissions at the same frequency. For instance, in "RadChat: Spectrum Sharing for Automotive Radar Interference Mitigation", IEEE Transactions on Intelligent Transportation Systems, vol. 22, no. 1, pp. 416-429, January 2021, the authors C. Aydogdu, M. F. Keskin, N. Garcia, H. Wymeersch and D. W. Bliss discuss a distributed approach to radar coordination in vehicular networks, which has shown promising results.

However, despite these rather effective methods for mitigating interference among automotive radars, further techniques are desired in order to realize the full potential of automotive radar in applications such as advanced driver assistance systems (ADAS) and autonomous drive (AD).

It is an object of the present disclosure to provide improved methods and devices for interference mitigation in automotive radar systems. This object is obtained by a radar system for coordinated automotive radar transmission. The system comprises a cellular access network node configured to establish a primary time synchronized frame structure for cellular radio transmissions over a first local area in a first frequency band, wherein the primary time synchronized frame structure is at least partly defined by one or more transmitted synchronization signals, and one or more automotive radar transceivers arranged to determine a radar time reference from the one or more synchronization signals, and to establish a secondary time synchronized frame structure for radar transmissions over at least part of the first local area in a second frequency band, wherein the secondary time synchronized frame structure is at least partly defined by the radar time reference.

Thus, the radar transceivers inherit time synchronization from the cellular access network. This way radar transceivers operating in the second frequency band can be synchronized and at least some of the mutual interference can be avoided without deploying a separate synchronization infrastructure, which is an advantage. As will be explained in the following, several different implementations for exactly how to inherit synchronization from the cellular access network are possible, each with respective advantages. The radar transceivers may operate separately from the cellular access network, without the cellular access network being aware that the time reference has been inherited. However, further advantages can be obtained if the cellular access network takes an active part in the synchronization of the radar transceivers in a more advanced implementation.

According to some aspects, the network node is comprised in a third generation partnership program (3GPP) defined cellular access network. 3GPP networks are globally present and therefore offer a large existing coverage, which is an advantage.

According to some aspects, the one or more automotive radar transceivers are frequency modulated continuous wave (FMCW) radar transceivers. FMCW radar is by far the most common automotive radar signal format. It is an advantage that FMCW transmission signals can be re-used in the proposed system, since the radar transceivers can be designed in a cost efficient manner and still offer good performance characteristics in terms of, e.g., detection performance. The methods disclosed herein allow for synchronizing automotive radar transceivers in a 3GPP defined OFDM-based cellular access network without requiring the automotive radar to implement OFDM-based radar operation, which is an advantage.

According to some aspects, the second frequency band is different from the first frequency band. This means that the time reference is inherited from communication in one band and re-used for synchronizing radar transmission in another frequency band. Thus, advantageously, there is no need to allocate transmission resources for the radar transceivers in the first frequency band, which may be congested and/or associated with expensive transmission licenses.

According to some aspects, the secondary time synchronized frame structure comprises consecutive transmission time slots of a predetermined time slot duration, where the start of a time slot is determined based on the time reference. Thus, the secondary time synchronized frame structure may accommodate several radar transceivers which achieve mutual synchronization by transmitting in the different time slots. Again, this secondary time synchronized frame structure can be defined without any interaction with the cellular system, operating independently from the cellular system, or it can be at least partly controlled from the cellular system.

According to some aspects, the one or more automotive radar transceivers are arranged to detect time slots associated with ongoing radar transmissions in the secondary time synchronized frame structure prior to selecting a time slot for radar transmission. This mode of operation is akin to a listen-before-send strategy, which can be implemented independently from the cellular system, which is an advantage. A carrier-sense multiple-access (CSMA) strategy of this kind has shown good performance in other applications, where it is normally very robust with very little signalling overhead incurred, which is an advantage.

According to some aspects, the network node is configured to allocate transmission resources for radar transmission to at least some of the one or more automotive radar transceivers in the secondary time synchronized frame structure. According to these aspects, the network node assumes a scheduling function and actively allocates transmission resources to the radar transceivers which are then able to avoid mutually interfering with each other. The scheduling functions of the cellular network can be re-used for this purpose, which is an advantage.

According to some aspects, the network node is configured to communicate one or more FMCW transmission parameters to the one or more automotive radar transceivers using a communication channel supported in the first frequency band. This feature allows the network node to configure the FMCW transceivers, and thus achieve further optimization. The FMCW transmission parameters may, e.g., comprise duty cycle, frequency ramp time derivative, frequency span, and so on.

According to some aspects, the one or more automotive radar transceivers are arranged to establish a further secondary time synchronized frame structure for radar transmissions over a second local area in a third frequency band in response to a handover operation involving the network node. This way the frequency re-use organization of the cellular network can be exploited also for the radar transceivers. The radar transceivers may now achieve an increased overall spectral efficiency by re-using frequency bands spatially.

According to some aspects, the network node is arranged for spectrum sharing, and the second frequency band is comprised in the first frequency band. This means that the wireless devices in the cellular network and the automotive radar transceivers at least partly share the same frequency band. This is an advantage since a higher spectral efficiency can be obtained by jointly operating in the same frequency band.

This object is also obtained by methods that are associated with the above advantages.

BRIEF DESCRIPTION OF THE DRAWINGS

The present disclosure will now be described more in detail with reference to the appended drawings, where.

DETAILED DESCRIPTION

Figure 1:
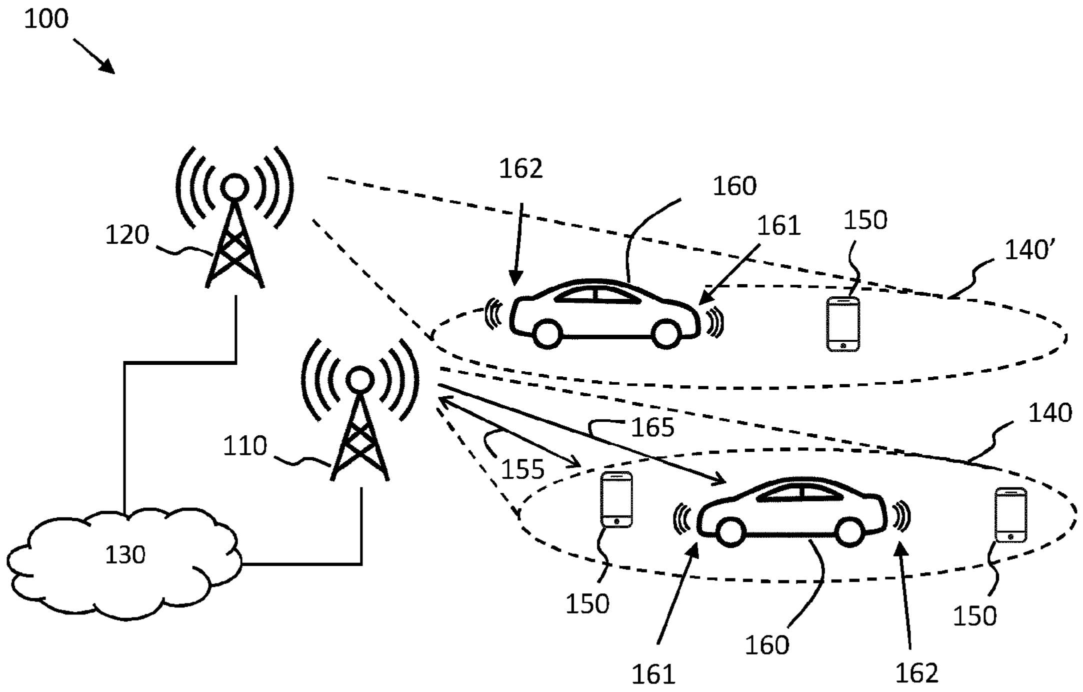
FIG. 1 illustrates an example radar system according to the present disclosure.

FIG. 1 shows parts of a cellular access network comprising radio base stations 110, 120 connected to a core network 130. The radio base stations 110, 120 as well as the different entities of the core network 130 will be referred to herein as network nodes. Thus, the term network node is to be construed broadly herein to encompass any form of radio access network infrastructure device, or software module executed on processing circuitry within the cellular access network. It is appreciated that the radio base stations 110, 120 may also be realized as transmission points (TRP) in a wireless network, where the radio units of the radio base stations 110, 120 also are at least in part realized as part of the core network 130.

The radio base stations 110, 120 provide cellular access 155 to a number of wireless devices 150 over respective coverage areas 140, 140'. As part of this cellular access, the radio base stations 110, 120 generate and transmit synchronization signals which are broadcasted over the coverage areas 140, 140', where the synchronization signals are used by the wireless devices 150 to synchronize both in time and in frequency with respect to the cellular access network. These synchronization signals are normally part of a global standard, meaning that they will have the same format regardless of where in the world they are transmitted.

Most cellular access networks today are based on one of the standards defined by the third generation partnership program (3GPP). These standards comprise fourth generation (4G) and fifth generation (5G) systems, and work is underway in defining sixth generation (6G) systems.

One or more vehicles 160 are located within the coverage areas 140, 140' of the radio base stations 110, 120. These vehicles comprise radar transceivers 161, 162 which are either controlled independently from each other, or by some central vehicle electronic control unit (ECU) in the vehicle.

Figure 2:
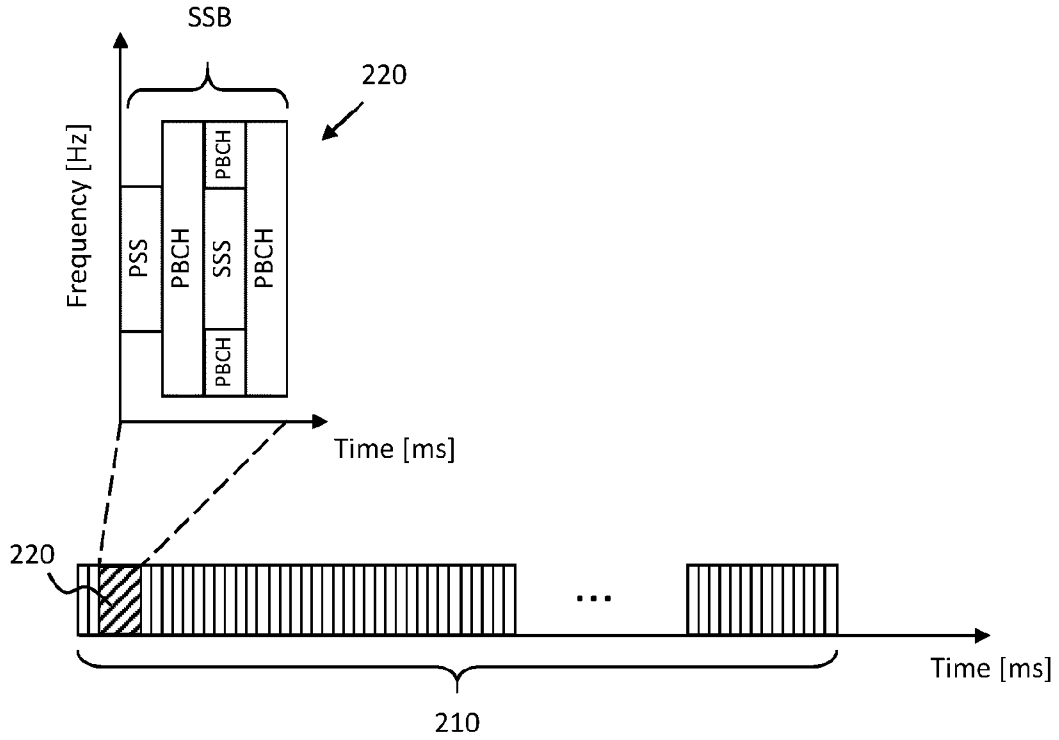
FIG. 2 shows an example time synchronized frame structure in a cellular access network.

FIG. 2 schematically illustrates an example of a time synchronized frame structure 210 used in the 3GPP context of the 5G new radio (NR) air interface. A synchronization signal 220 referred to as a synchronization signal block (SSB) is transmitted periodically. The NR synchronization signal (SS) consists of a primary SS (PSS) and secondary SS (SSS). The SSB also comprises a Physical Broadcast Channel (PBCH), which carries information related to the access network. An SSB is normally mapped to 4 orthogonal frequency division multiplex (OFDM) symbols in the time domain and contiguous subcarriers in the frequency domain. This synchronization signal 220 is broadcasted from the radio base stations regularly and can be received by a wireless device 150 located within the coverage area 140, 140'.

The synchronization mechanisms of the various 3GPP defined radio standards are well known and will therefore not be discussed in more detail herein. Further details regarding the synchronization signals transmitted in 5G-NR can, e.g., be found in X. Lin et al., "5G New Radio: Unveiling the Essentials of the Next Generation Wireless Access Technology," in IEEE Communications Standards Magazine, vol. 3, no. 3, pp. 30-37, September 2019. Detailed information regarding the structure and properties of the synchronization signals can also be found in the relevant standard texts published by the 3GPP.

A problem encountered when trying to coordinate automotive radar transceivers is that an infrastructure for distributing automotive radar synchronization signals is not available, at least not globally. Investing in such an infrastructure will be very costly and will also take a long time to deploy, conditioned on that automotive radar manufacturers and original equipment manufacturers (OEM) can agree on a format for such radar synchronization standards. This is at least part of the reason why distributed systems have been proposed, such as the RadChat system mentioned above.

The present disclosure builds on the realization that the synchronization signals transmitted in cellular access networks can be re-used for synchronizing automotive radar transmissions, without any changes required to the cellular access network per se. The radar transceivers 161, 162 in the automotive radar system can passively listen to the synchronization signals 220 broadcasted in the cellular system and use these synchronization signals 220 to determine a radar time reference which can then form the basis for a time synchronized frame structure in a radar frequency band which may be totally separate from the communication frequency band of the cellular access network. The synchronization signals 220 may either be received by a cellular access transceiver or by a dedicated receiver arranged solely for the reception of the cellular access network synchronization signals. This way the radar time synchronization is borrowed from, or piggy-backed onto, the synchronization of the cellular access network, for which the required infrastructure is already in place, or at least being deployed at a rapid pace globally.

Figure 9A:
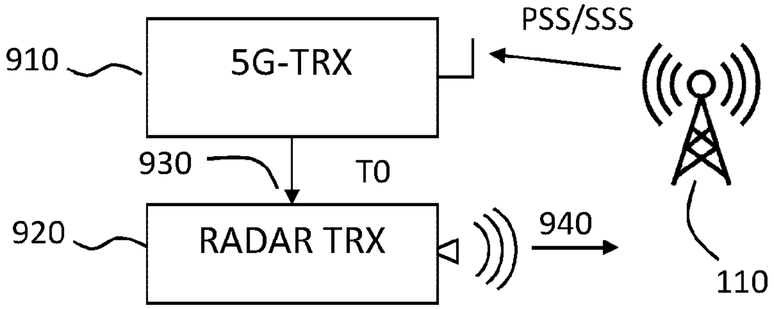
FIGS. 9A-B schematically illustrate example radar transceivers.
Figure 9B:
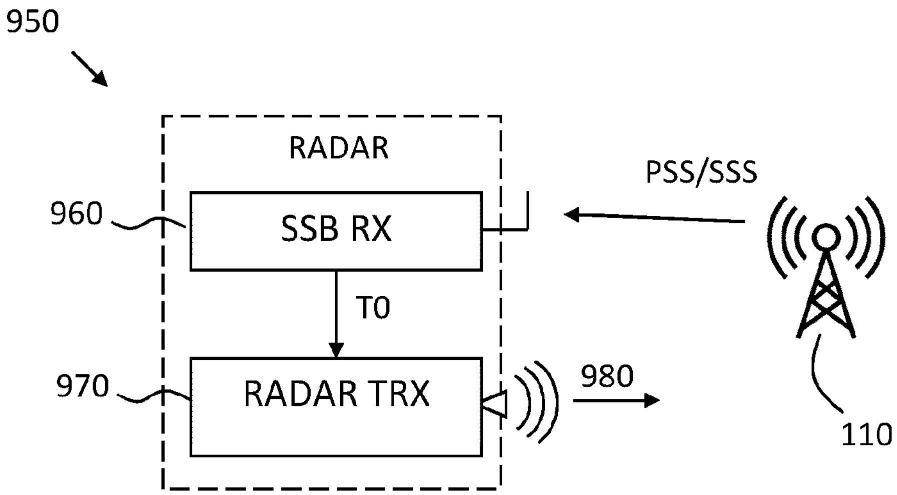

Some example radar transceivers designed to exploit this idea will be discussed in more detail below in connection to FIGS. 9A and 9B. FIG. 9A shows an example where the radar device is connected to a 5G transceiver (5G-TRX) 910. The 5G-TRX 910 maintains a wireless connection to the cellular access network, i.e., the radio base station 110, for sending and receiving data, and also outputs a radar time reference T0 to an input port 930 on the radar transceiver 920, which time reference can then be used by the radar transceiver 920 to synchronize its transmissions 940 with respect to other radar transceivers in its vicinity. In FIG. 9B, there is a radar transceiver arrangement 950 that implements a dedicated receiver circuit (SSB RX) 960 for detecting the synchronization signal broadcasted in the cellular access network. The dedicated receiver then generates a radar time reference T0 which is used by the radar transceiver 970 to synchronize its transmissions 980 with respect to other radar transceivers in its vicinity.

Figure 3:
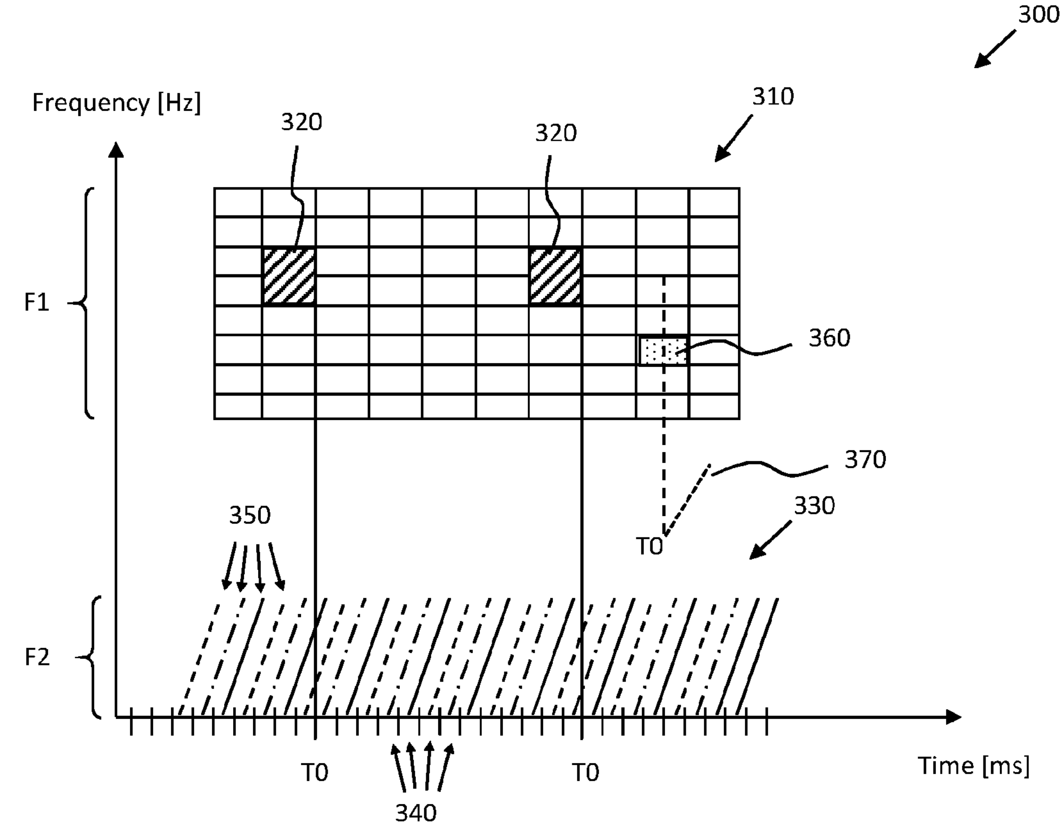
FIG. 3 illustrates automotive radar transceiver coordination according to an example of the disclosed technique.

FIG. 3 illustrates an example 300 of the herein proposed radar transmission coordination techniques. The cellular access network is here exemplified by an OFDM system which uses a time synchronized frame structure 310 that comprises regularly transmitted synchronization signals 320, e.g., SSB transmissions. This frame structure will be referred to herein as a primary time synchronized frame structure. The cellular access network operates in a first frequency band F1 and is not necessarily aware of the radar transmission coordination which is ongoing in parallel based on passive reception of the regularly broadcasted synchronization signals 320. A number of automotive radar transceivers are generating coordinated radar transmissions 350 in a second frequency band F2, here separated in frequency from the first frequency band F1. In FIG. 3, the first frequency band F1 is shown to be of a larger magnitude than the second frequency band F2. This is of course only an example, the second frequency band F2 can according to some aspects be of a larger magnitude than the first frequency band F1. The second frequency band F2 can according to some further aspects be an FMCW radar frequency band that exceeds 75 GHz.

The radar transmissions take place in a secondary time synchronized frame structure 330, which is established based on a radar time reference T0 that is determined from the one or more synchronization signals 320. In the example of FIG. 3, this radar time reference T0 is simply determined as the end of the synchronization signal 320 of the cellular access network.

Thus, the radar transceivers listen to the synchronization signals broadcasted in the cellular access network, and then re-use the time reference of the cellular access network in coordinating radar transmissions. There is no requirement of any feedback from the radar transceivers back to the cellular access network, although additional benefit can be obtained by this type of connection between the cellular access network and the radar transceivers, as will be discussed in the following.

There are three radar transceivers operating in the example of FIG. 3, indicated by FMCW chirp signals of dashed line, dash-dotted line, and solid line. These radar transmissions are coordinated in a time slot structure, where each FMCW transmission starts in a time slot and spans over the entire second frequency band F2. Thus, there is no interference generated between the FMCW radar transmissions since there is only one single radar transmission starting in each time slot. In this way, the automotive radar system inherits time synchronization from the cellular access network, without the cellular access network necessarily being aware of this "piggy-backed" time synchronization.

It is also possible to use the payload resource blocks of the cellular access network synchronization of radar transmissions 370. This is illustrated by the transmission 360, which is part of a connection between a synchronization server connected somewhere to the core network 130 and a particular radar transceiver. The synchronization server then regularly transmits synchronization commands specifically to a given radar transceiver, with instructions about when to transmit, and optionally also which FMCW format to use, in terms of frequency sweep range, duration, duty cycle, etc.

To summarize the main concepts discussed so far, there is disclosed herein a radar system 100 arranged for coordinated automotive radar transmission. The system 100 comprises a cellular access network node 110, 120, 130 configured to establish a primary time synchronized frame structure 210, 310 for cellular radio transmissions over a first local area 140 in a first frequency band F1. It is appreciated that the primary time synchronized frame structure can be established either by the radio base station 110, 120, or by some unit in the core network 130, as discussed above.

In both cases, the primary time synchronized frame structure 210, 310 is at least partly defined by one or more transmitted synchronization signals 220, 320 in the cellular access network of the cellular access network node. The radar system 100 also comprises one or more automotive radar transceivers 161, 162 arranged to determine a radar time reference T0 from the one or more synchronization signals 220, 320, and to establish a secondary time synchronized frame structure 330 for radar transmissions over at least part of the first local area 140 in a second frequency band F2, wherein the secondary time synchronized frame structure 330 is at least partly defined by the radar time reference T0.

Put differently, the secondary time synchronized frame structure 330 is one that can be unambiguously derived from the one or more transmitted synchronization signals 220. This secondary time synchronized frame structure is not necessarily a time-slot structure, as exemplified by the separate transmission 370 in FIG. 3, although a time-slot structure seems appropriate.

It is appreciated that the second frequency band F2 is not the same frequency band as the first frequency band, but different from the first frequency band F1 in some way, i.e., the proposed system still uses an automotive radar frequency band within which radar transmissions are constrained. This automotive radar frequency band can be entirely separate from the first frequency band, as illustrated in FIG. 3. However, the second frequency band may also be comprised within the first frequency band, preferably then in a dynamic manner where a dynamic resource allocation function is continuously executed to divide the available time/frequency resources between the cellular access network function and the automotive radar function.

It is envisioned that the network node 110, 120, 130 will be comprised in a 3GPP defined cellular access network, such as a 4G, 5G, or 6G network. However, the general concepts and ideas disclosed herein are of course also applicable in other types of radio access networks where synchronization signals are transmitted as part of the communications operations in the network, which synchronization signals can be inherited by an automotive radar system in order to synchronize transmissions by these radar transceivers and thereby avoid interference between the radar transceivers. It is also envisioned that the one or more automotive radar transceivers 161, 162 are FMCW radar transceivers since this is by far the most common technology in automotive radar today. However, other radar signal formats can of course also be considered for coordination by the herein proposed techniques.

The secondary time synchronized frame structure 330 optionally comprises consecutive transmission time slots 340 of a predetermined time slot duration, as illustrated in FIG. 3, where the start of a time slot is determined based on the time reference T0. Once this secondary time synchronized frame structure 330 has been established, the main hurdle towards coordinated automotive radar transmission has been overcome, i.e., each radar transceiver is able to establish a time base which is shared at least among radar transceivers in the same local area. This time base can be used in various ways.

For instance, the one or more automotive radar transceivers 161, 162 are optionally arranged to detect time slots associated with ongoing radar transmissions in the secondary time synchronized frame structure 330 prior to selecting a time slot for radar transmission, akin to a listen before transmit type of medium access control scheme. Suppose for instance that the frame structure has a certain length associated with a preferred duty cycle of the automotive radar transceivers. A radar transceiver wishing to commence radar operation in a local area may then establish time synchronization based on the radar time reference TO, and then observe ongoing radar transmissions in some initial radar frame or frames in order to see which slots that have been occupied and which slots that are free to use.

Assuming that radar transceivers transmit in the same time slots over consecutive frames of the secondary time synchronized frame structure 330, the free time slots in the initially observed frame or frames can be expected to be free also in the next and following frames. In case some other radar transceiver wants to commence radar operation at exactly the same time and monitors the same initial radar frame in order to detect free transmission slots, there is an obvious risk for collision. If such collision occurs, then the radar transceivers may detect the resulting interference, using e.g., the interference detection techniques proposed in EP3173812 A1, perform a random back-off procedure, and try to commence radar operation again after a random back-off time duration. Random back-off mechanisms are well-known and will therefore not be discussed in more detail herein.

The different control entities comprised in the cellular access network can of course also be used to allocate transmission resources in the secondary time synchronized frame structure 330. This feature then voids the need for the listen before transmit type of medium access control discussed above. According to some aspects, a network node, i.e., one of the radio base stations 110, 120 or an entity comprised in the core network 130 is configured to allocate transmission resources for radar transmission to at least some of the one or more automotive radar transceivers 161,162 in the secondary time synchronized frame structure 330.

This means that the cellular access network now not only passively provides the synchronization signal upon which the time synchronization of the radar transmissions are piggy-backed, but also actively coordinates radar transmissions. For instance, the cellular access network may assign transmission slots for each radar transceiver, and the radar transceivers can then start FMCW chirps in the assigned slots without suffering interference from nearby radar transceivers, since these radar transceivers will start their chirp transmissions in other slots.

The radar transceiver may, e.g., transmit requests for a transmission resource to the cellular access network, which may implement an arbitration function and a resource scheduling function that determines a suitable resource assignment for radar transmissions in the second frequency band. The different radar transceiver may in this case also be associated with respective priorities, similar to a quality of service feature, where premium radar transceivers, or radar transceivers in particular need of transmission resources, are assigned transmission resources more frequently than other radar transceivers.

The radar transceivers may be integrally formed, i.e., integrated with cellular access transceivers in order to realize this feature of being more actively coordinated. Alternatively, the radar transceivers may comprise an input port configured for receiving transmission instructions from an associated cellular access transceiver, such as a 5G-NR transceiver. This type of set-up will be discussed in more detail below in connection to FIGS. 9A and 9B.

According to other aspects, the network node 110, 120, 130 is configured to communicate one or more FMCW transmission parameters to the one or more automotive radar transceivers 161,162 using a communication channel supported in the first frequency band F1. This information may be comprised in a PBCH channel of a 5G-NR SSB, or in some other pre-determined communication channel. The FMCW transmission parameters may comprise, e.g., a transmission frequency range to be swept by an FMCW chirp, a duty cycle, and/or a time slot duration. The FMCW transmission parameters may also comprise a pre-determined frame structure to be adhered to by the radar transceivers as long as they are within reach of the radio base station transmitting the synchronization signal whereupon the secondary time synchronized frame structure is based. This feature allows the cellular access network, or some radar coordinating entity connected to the cellular access network, to parameterize the automotive radar transceivers via the cellular access network.

The cellular access network may implement a dynamic spectrum sharing (DSS) feature for sharing available spectrum between cellular communications and radar operation. DSS already provides a very useful migration path from LTE to NR by allowing LTE and NR to share the same carrier. DSS was included in Release 15 and further enhanced in Release 16 of the 3GPP cellular network standards.

In DSS, two or more wireless systems may use the same time/frequency resources, although not at the same time and geographical area. An arbitrator function can be configured to distribute the communication resources dynamically over time and frequency between the two or more systems depending, e.g., on current network state. New decisions on resource allocations may, e.g., be taken on a millisecond basis.

According to some aspects, the network node 110, 120, 130 is arranged for spectrum sharing, in which case the second frequency band F2 may be comprised in the first frequency band F1.

The synchronization mechanisms disclosed herein may also comprise individual separate links 360 established from a synchronization server connected to the core network 130 and separate automotive radar transceivers. These separate automotive radar transceivers then connect to the synchronization server using cellar access network transceivers arranged for operation in the first frequency band, whereupon the synchronization server issues transmission synchronization signals over the cellular access network. The radar transceivers then synchronize radar transmissions in the second frequency band based on these transmission synchronization signals.

Figure 4:
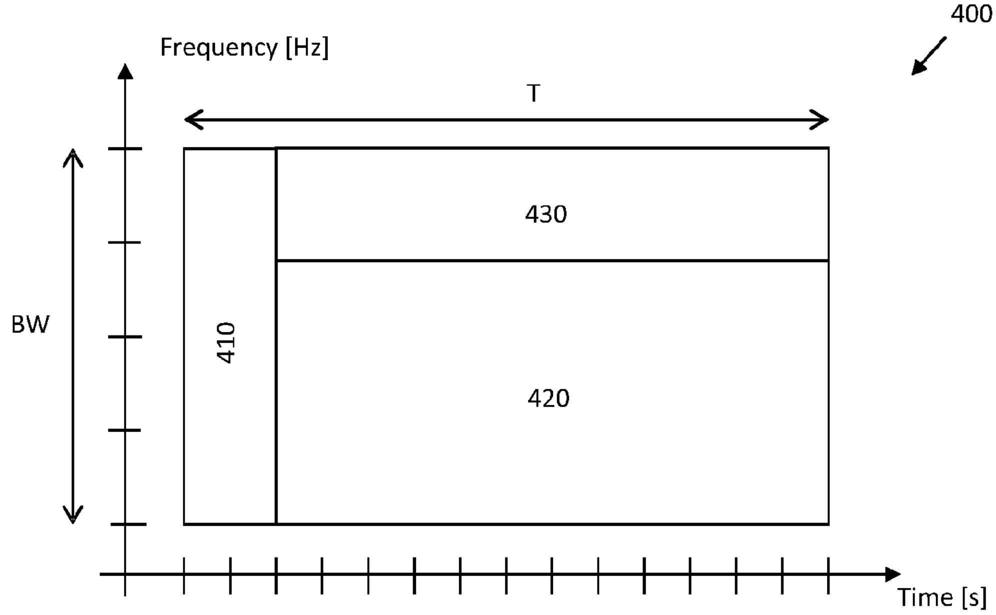
FIG. 4 schematically illustrates dynamic spectrum sharing.

FIG. 4 shows an example of a time/frequency resource assignment 400. The available time/frequency resources are delimited in time by a frame duration T, and in frequency by a frequency band BW. In this example an LTE system has been assigned resources for control channels such as the LTE physical downlink control channel (PDCCH) in a first portion 410 of the frame, while an automotive radar system has been assigned resources in a second part 420. The LTE system is assigned resources for user traffic in a third part 430.

Figure 5A:
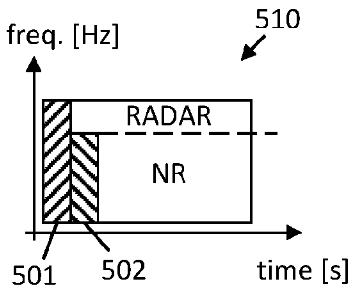
FIGS. 5A-C show example dynamic spectrum sharing resource assignments in a cellular access network.
Figure 5B:
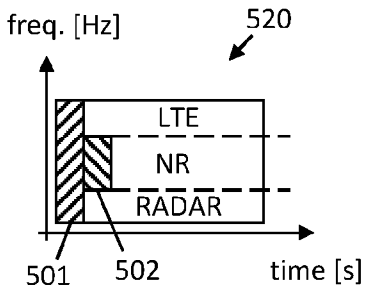
Figure 5C:
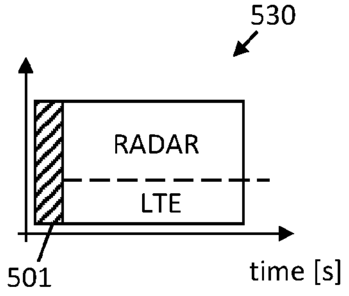

FIGS. 5A-5C illustrate example dynamic spectrum sharing resource assignments 510, 520, 530. Each assignment here comprises an LTE control channel 501, followed by an optional 5G-NR control channel part 502. The automotive radar signals are allowed to exist in a part of the band which is normally reserved for LTE operation in an LTE/5G-NR spectrum sharing context. The part of the frequency band where FMCW transmissions are allowed may vary, as illustrated in FIGS. 5A-C. For instance, FIG. 5A shows a case where 5G-NR coexists temporarily with automotive radar transmission, while FIG. 5B shows an example where both LTE and 5G-NR coexists with automotive radar operation. FIG. 5C illustrates an example where LTE coexists with radar transmission in the same frequency band.

Another concept which was introduced by the 3GPP with 5G-NR is a feature known as bandwidth parts (BWP). BWP enables more flexibility in how resources are assigned in a given carrier. The feature increases the flexibility of the resource assignment in a cellular access network so that multiple, different signal types can be sent in a given bandwidth. Most base stations can utilize the wider bandwidths available in 5G. User equipment (UE) capabilities, however, will vary and it will be more challenging for some UEs to use the larger available bandwidths. BWP enable multiplexing of different signals and signal types for better utilization and adaptation of spectrum and UE power.

With bandwidth parts, a cellular communication system carrier can be subdivided and used for different purposes. Each 5G-NR BWP has its own numerology, meaning that each BWP can be configured differently with its own signal characteristic, enabling more efficient use of the spectrum and more efficient use of power. This feature is good for integrating signals with different requirements. One BWP may have reduced energy requirements, while another may support different functions or services, and yet another may provide coexistence with other systems. Bandwidth parts will support legacy 4G devices with new 5G devices on the same carrier and may also be configured to support FMCW transmission.

With reference again to FIG. 1, the radar system 100 may optionally also inherit a cell structure 140, 140' and handover operation from the cellular access network. This way a function similar to frequency re-use can be implemented, thus allowing an increase in spectral efficiency of the overall radar system 100. For instance, each local area 140, 140' may be associated with a frequency band for radar operation. Thus, as vehicles move across cell borders, they change radar operating frequency, which allows time slots to be freed up for other radars to use. According to aspects, the one or more automotive radar transceivers 161,162 are arranged to establish a further secondary time synchronized frame structure for radar transmissions over a second local area 140' in a third frequency band in response to a handover operation involving the network node 110, 120, 130. Thus, if the radar transceiver 161, 162 is able to receive synchronization signals from another radio base station, it may decide to commence radar operation in a further secondary time synchronized frame structure which has been established based on the new synchronization signal. The third frequency band may be separate from the second frequency band, i.e., the radar operation may shift frequency along with the hand-over performed in the cellular access system. Alternatively, the third frequency band may be the same frequency band as the second frequency band, i.e., only the time reference then changes in response to the hand-over operation.

Figure 6:
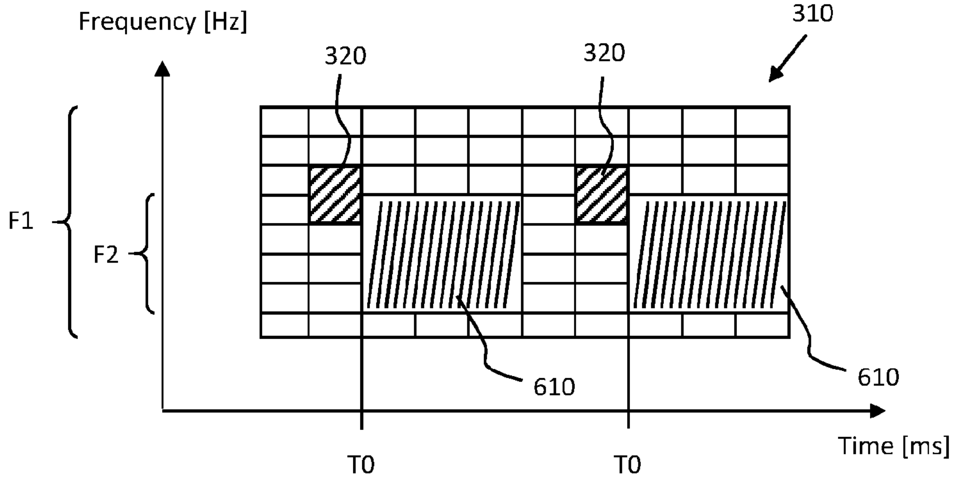
FIG. 6 shows another example of dynamic spectrum sharing.

FIG. 6 illustrates another example where automotive FMCW operation has been allowed within a 5G-NR frequency band. A block of time/frequency resources has been reserved for FMCW operation 610 and communicated to a set of automotive radar transceivers. These automotive radar transceivers use the synchronization signals to align with the 5G-NR frame structure, and then transmit within the assigned time/frequency resource block.

Figure 7:
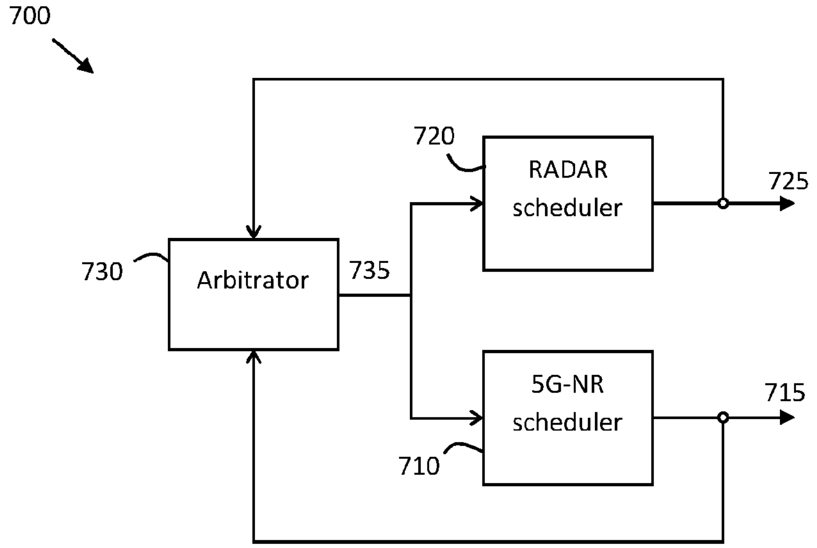
FIG. 7 illustrates joint radar and communications scheduling.

FIG. 7 shows a system for scheduling radar transmissions jointly with transmissions in the cellular access network, i.e., for determining a resource assignment in a dynamical manner, such as in a DSS function. A 5G-NR scheduler 710 schedules resource blocks of the 5G system in dependence of demand from the wireless devices in the system as described in the relevant 3GPP standard texts. A resulting schedule 715 is sent to an arbitrator function 730. At the same time, a radar scheduler function 720 assigns communications resources in dependence of, e.g., how many automotive radar transceivers that are located within its local area. This resource schedule 725 is also communicated to the arbitrator function 730. The arbitrator function 730 then decides if the two schedules are compatible, or if available communications resources are exceeded, in which case it will determine which of the two schedulers that should reduce its resource assignment. The result of the arbitration 735, including any requests for reduction of total assigned resources, is sent back to the scheduler units. According to one example, the arbitrator function 730 determines a resource split like that illustrated in FIGS. 5A-C in a dynamic manner, such that time/frequency resources are utilized in an efficient manner.

Figure 8:
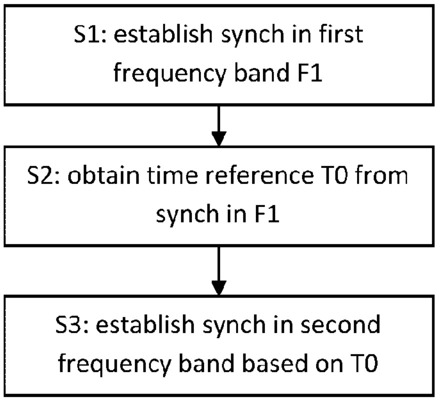
FIG. 8 is a flowchart illustrating an example method.

FIG. 8 is a flow chart illustrating a method which summarizes the discussions above. The flow chart illustrates a method performed in a radar system 100 for coordinated automotive radar transmission. The method comprises:

establishing S1 a primary time synchronized frame structure 210, 310 for radio transmissions over a first local area 140 in a first frequency band F1, wherein the primary time synchronized frame structure 310 is at least partly defined by one or more synchronization signals 220, 320 transmitted from a network node 110, 120, 130, determining S2 a radar time reference T0 from the one or more synchronization signals 220, 320, and establishing S3 a secondary time synchronized frame structure 330 for radar transmissions over at least part of the first local area 140 in a second frequency band F2, wherein the secondary time synchronized frame structure 330 is at least partly defined by the radar time reference T0.

FIG. 9A shows a radar transceiver 920 arranged to generate an FMCW transmission 940. The radar transceiver is arranged to obtain a radar time reference TO determined from one or more synchronization signals 220, 320 transmitted in a cellular access network, and to establish a secondary time synchronized frame structure 330 for radar transmissions in a second frequency band F2, wherein the secondary time synchronized frame structure 330 is at least partly defined by the radar time reference TO.

The radar transceiver 920 comprises an input port 930 for receiving the radar time reference T0 from a communications transceiver 910 arranged to communicate with a cellular access network node 110.

With reference also to FIG. 1-3, there is also shown a cellular access network node 110 configured to establish a primary time synchronized frame structure 210, 310 for cellular radio transmissions over a first local area 140 in a first frequency band F1, wherein the primary time synchronized frame structure 210, 310 is at least partly defined by one or more transmitted synchronization signals 220, 320, and wherein the cellular access network node 110, 120, 130 is arranged to schedule radar transmissions in a secondary time synchronized frame structure 330 for radar transmissions in a second frequency band F2.

FIG. 9B illustrates an example of a radar transceiver arrangement 950 which comprises a dedicated receiver 960 (SSB RX) for receiving the PSS/SSS synchronization signal in a 3GPP-defined cellular access network. This dedicated synch receiver generates the radar time reference T0 upon detection of an SSB. A radar transceiver 970 then coordinates its radar transmissions 980 based on this time reference, as discussed above. The SSB RX may be implemented as a correlator receiver matched to the synchronization signal of interest.

Figure 10:
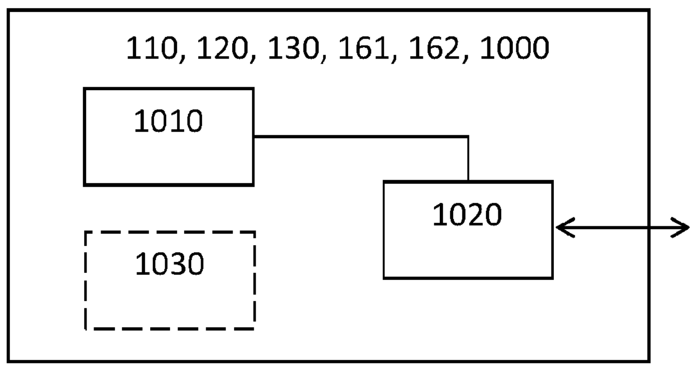
FIG. 10 shows an example hardware device.

FIG. 10 schematically illustrates, in terms of a number of functional units, the general components of a device 1000 such as a radar transceiver 161, 162 or a network node 110, 120, 130 according to embodiments of the discussions herein. Processing circuitry 1010 is provided using any combination of one or more of a suitable central processing unit CPU, multiprocessor, microcontroller, digital signal processor DSP, etc., capable of executing software instructions stored in a computer program product, e.g., in the form of a storage medium 1030. The processing circuitry 1010 may further be provided as at least one application specific integrated circuit ASIC, or field programmable gate array FPGA.

Particularly, the processing circuitry 1010 is configured to cause the device 1000 to perform a set of operations, or steps, such as the methods discussed in connection to FIG. 8 and the discussions above. For example, the storage medium 1030 may store the set of operations, and the processing circuitry 1010 may be configured to retrieve the set of operations from the storage medium 1030 to cause the device to perform the set of operations. The set of operations may be provided as a set of executable instructions. Thus, the processing circuitry 1010 is thereby arranged to execute methods as herein disclosed.

The storage medium 1030 may also comprise persistent storage, which, for example, can be any single one or combination of magnetic memory, optical memory, solid state memory or even remotely mounted memory.

The device 1000 may further comprise an interface 1020 for communications with at least one external device. As such the interface 1020 may comprise one or more transmitters and receivers, comprising analogue and digital components and a suitable number of ports for wireline or wireless communication.

The processing circuitry 1010 controls the general operation of the device, e.g., by sending data and control signals to the interface 1020 and the storage medium 1030, by receiving data and reports from the interface 1020, and by retrieving data and instructions from the storage medium 1030. Other components, as well as the related functionality, of the control node are omitted in order not to obscure the concepts presented herein.

Figure 11:
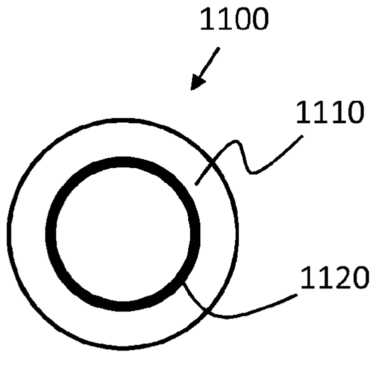
FIG. 11 schematically illustrates a computer program product.

FIG. 11 illustrates a computer readable medium 1110 carrying a computer program comprising program code means 1120 for performing the methods illustrated in FIG. 8, when said program product is run on a computer. The computer readable medium and the code means may together form a computer program product 1100.

The invention claimed is:

1. A radar system for coordinated automotive radar transmission, comprising a cellular access network node configured to establish a primary time synchronized frame structure for cellular radio transmissions over a first local area in a first frequency band, wherein the primary time synchronized frame structure is at least partly defined by one or more synchronization signals transmitted by the cellular access network node, and one or more automotive radar transceivers arranged to determine a radar time reference from the one or more synchronization signals, and to establish a secondary time synchronized frame structure for radar transmissions over at least part of the first local area in a second frequency band, wherein the secondary time synchronized frame structure is at least partly defined by the radar time reference, wherein the cellular access network node is configured to allocate transmission resources for radar transmission to at least some of the one or more automotive radar transceivers in the secondary time synchronized frame structure.

2. The radar system according to claim 1, wherein the network node includes a third generation partnership program, 3GPP, defined cellular access network.

3. The radar system according to claim 1, wherein the one or more automotive radar transceivers are frequency modulated continuous wave, FMCW, radar transceivers.

4. The radar system according to claim 1, where the second frequency band is different from the first frequency band.

5. The radar system according to claim 1, where the secondary time synchronized frame structure comprises consecutive transmission time slots of a predetermined time slot duration, where the start of a time slot is determined based on the time reference.

6. The radar system according to claim 5 where the one or more automotive radar transceivers are arranged to detect time slots associated with ongoing radar transmissions in the secondary time synchronized frame structure prior to selecting a time slot for radar transmission.

7. The radar system according to claim 1, where the network node is configured to communicate one or more FMCW transmission parameters to the one or more automotive radar transceivers using a communication channel supported in the first frequency band.

8. The radar system according to claim 1, where the one or more automotive radar transceivers are arranged to establish a further secondary time synchronized frame structure for radar transmissions over a second local area in a third frequency band in response to a handover operation between access areas of the cellular access network involving the network node.

9. The radar system according to claim 1, where the network node is arranged for spectrum sharing, and where the second frequency band is comprised in the first frequency band.

10. A method performed in a radar system for coordinated automotive radar transmission, the method comprising:

establishing a primary time synchronized frame structure for radio transmissions over a first local area in a first frequency band, wherein the primary time synchronized frame structure is at least partly defined by one or more synchronization signals transmitted from a network node, determining a radar time reference from the one or more synchronization signals, and establishing a secondary time synchronized frame structure for radar transmissions over at least part of the first local area in a second frequency band, wherein the secondary time synchronized frame structure is at least partly defined by the radar time reference, wherein the network node is arranged for spectrum sharing, and wherein the second frequency band is comprised in the first frequency band.

11. A radar transceiver configured to generate a frequency modulated continuous wave, FMCW, transmission, wherein the radar transceiver is arranged to obtain a radar time reference determined from one or more synchronization signals transmitted in a cellular access network, and to establish a secondary time synchronized frame structure for radar transmissions in a second frequency band, wherein the secondary time synchronized frame structure is at least partly defined by the radar time reference, wherein the radar transceiver is arranged to establish a further secondary time synchronized frame structure for radar transmissions over a second local area in a third frequency band in response to a handover operation between access areas of the cellular access network.

12. The radar transceiver according to claim 11, comprising an input port for receiving the radar time reference from a communications transceiver arranged to communicate with a cellular access network node.

13. A cellular access network node configured to establish a primary time synchronized frame structure for cellular radio transmissions over a first local area in a first frequency band, wherein the primary time synchronized frame structure is at least partly defined by one or more synchronization signals transmitted by the cellular access network node, and wherein the cellular access network node is arranged to schedule radar transmissions in a secondary time synchronized frame structure for radar transmissions in a second frequency band, wherein the cellular access network node is configured to allocate transmission resources for one or more automotive radar transceivers in the secondary time synchronized frame structure.

* * * * *